(12) United States Patent
Lavezzi et al.

(10) Patent No.: US 11,007,993 B2
(45) Date of Patent: May 18, 2021

(54) BRAKE PUMP FOR VEHICLES

(71) Applicant: FRENI BREMBO S.P.A., Bergamo (IT)

(72) Inventors: Roberto Lavezzi, Curno (IT); Mauro Reolon, Curno (IT)

(73) Assignee: Freni Brembo S.p.A., Bergamo (IT)

( * ) Notice: Subject to any disclaimer, the term of this patent is extended or adjusted under 35 U.S.C. 154(b) by 251 days.

(21) Appl. No.: 16/064,472

(22) PCT Filed: Dec. 23, 2016

(86) PCT No.: PCT/IB2016/057988
§ 371 (c)(1),
(2) Date: Jun. 21, 2018

(87) PCT Pub. No.: WO2017/109766
PCT Pub. Date: Jun. 29, 2017

(65) Prior Publication Data
US 2019/0023251 A1    Jan. 24, 2019

(30) Foreign Application Priority Data
Dec. 23, 2015 (IT) .................. 102015000087418

(51) Int. Cl.
*B60T 17/22* (2006.01)
*B60T 11/16* (2006.01)
(Continued)

(52) U.S. Cl.
CPC ............ *B60T 17/22* (2013.01); *B60Q 1/441* (2013.01); *B60T 7/102* (2013.01); *B60T 11/16* (2013.01); *B60T 11/22* (2013.01)

(58) Field of Classification Search
CPC ......... B60Q 1/441; B60T 7/102; B60T 11/16; B60T 11/20; B60T 11/22; B60T 17/18; B60T 17/22; B60T 17/226
(Continued)

(56) References Cited

U.S. PATENT DOCUMENTS 3,325,226 A * 6/1967 Perrino ................. B60T 8/74
303/115.3
3,411,133 A   11/1968 Gardner
(Continued)

FOREIGN PATENT DOCUMENTS

DE   2010073 A1   10/1971
DE   10352589 A1   6/2005
EP   1795421 A2   6/2007

OTHER PUBLICATIONS

European Patent Office, International Search Report with written opinion in Application PCT/IB2016/057988, dated Apr. 20, 2017, 10 pages, European Patent Office, Rijswijk Netherlands.

*Primary Examiner* — Robert A. Siconolfi
*Assistant Examiner* — San M Aung
(74) *Attorney, Agent, or Firm* — Marshall & Melhorn, LLC

(57) ABSTRACT

A brake pump for vehicles having a pump body and an actuation device, operatively associated with the pump body. The actuation device being operable to generate a braking. A piston is housed inside a housing of the pump body, the piston being operable by the actuation device to vary the pressure of a brake fluid in a braking system to which the brake pump belongs, to generate the braking. The brake pump also has a switch group and an auxiliary actuation element.

27 Claims, 16 Drawing Sheets

(51) Int. Cl.
 *B60Q 1/44* (2006.01)
 *B60T 7/10* (2006.01)
 *B60T 11/22* (2006.01)

(58) Field of Classification Search
 USPC .................................... 303/20, 3, 7, 115.1
 See application file for complete search history.

(56) References Cited

U.S. PATENT DOCUMENTS

| | | | | | |
|---|---|---|---|---|---|
| 3,587,041 | A | * | 6/1971 | Randol | B60T 11/20 340/452 |
| 3,626,366 | A | * | 12/1971 | Tam | B60T 17/226 340/450.1 |
| 3,699,513 | A | * | 10/1972 | Nicodeme | B60T 17/22 340/452 |
| 4,143,514 | A | * | 3/1979 | Leiber | B60T 7/042 303/114.1 |
| 4,526,003 | A | * | 7/1985 | Leiber | B60T 8/4018 303/113.4 |

\* cited by examiner

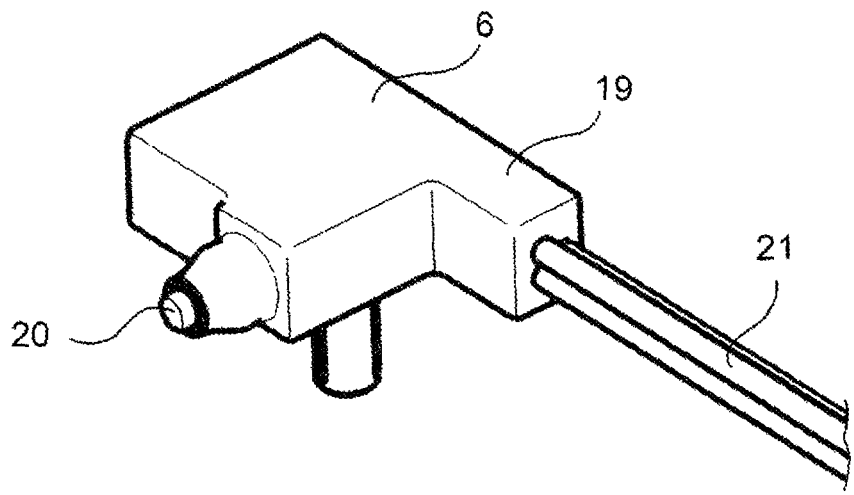
FIG. 4
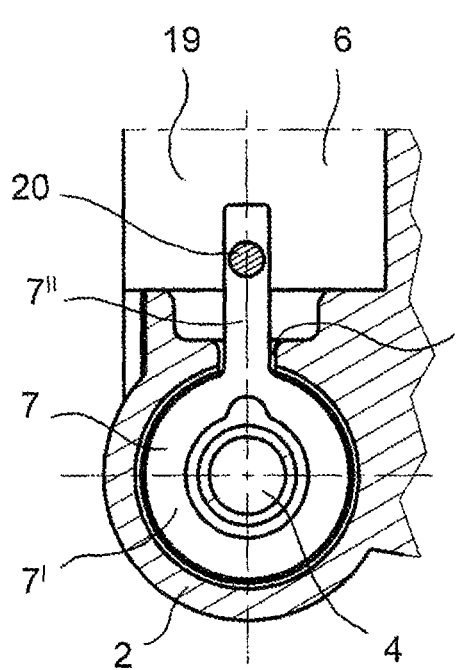
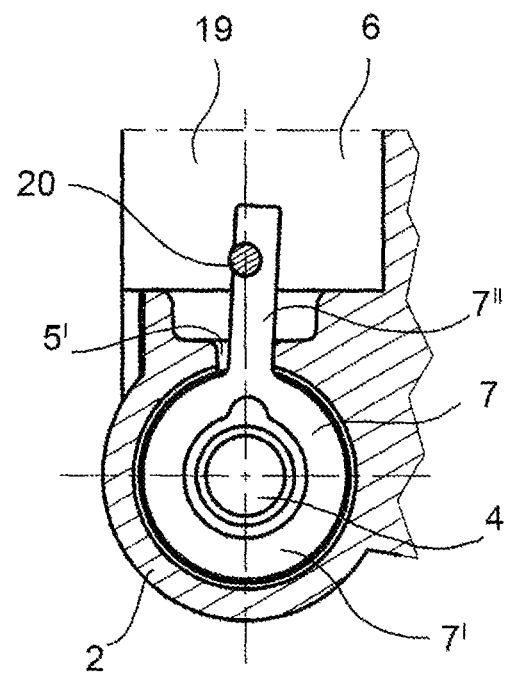
FIG. 5a  FIG. 5b

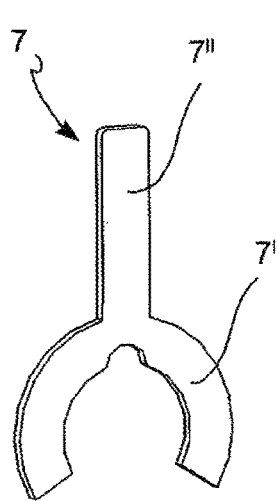
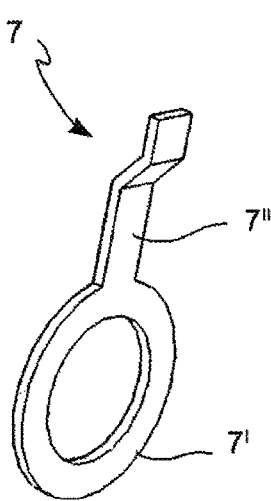
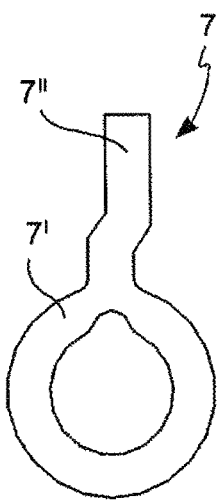
FIG. 13a    FIG. 13b    FIG. 13c
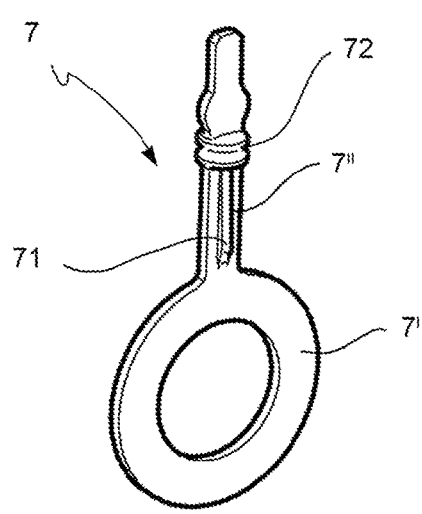
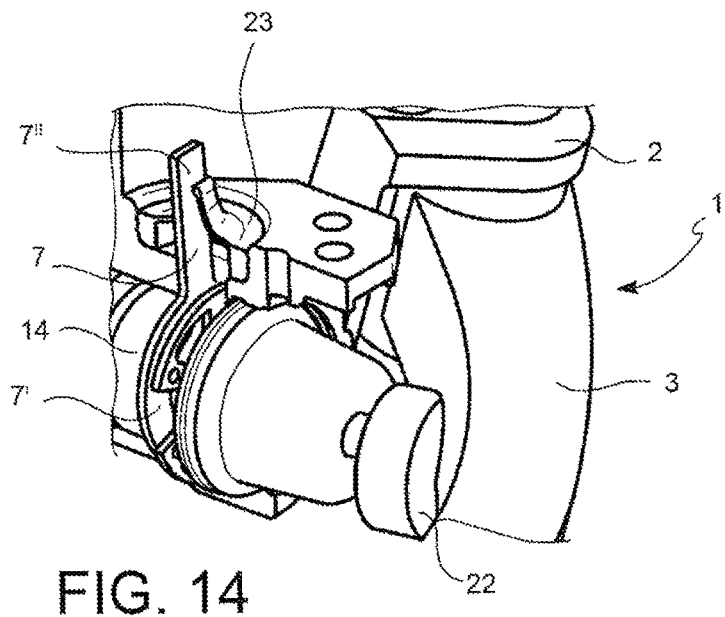
FIG. 13d    FIG. 14

BRAKE PUMP FOR VEHICLES

FIELD OF THE INVENTION

The present invention relates to a brake pump for vehicles.

BACKGROUND

In today's market of brake pumps for vehicles, increased performance in terms of sensitivity and readiness to intervene is increasingly requested, as ensured for example by "push-insert" type brake pumps with significantly reduced empty strokes because the movement of the braking lever or pedal immediately moves the piston which is adapted to vary the pressure of the brake fluid in the braking system which the brake pump belongs to.

Against this background, it is obviously increasingly more important that also the signaling of braking is as adequate as possible to the brake pump in terms of performance, not only for turning on the stop light but also for actuating other devices on board the vehicle (e.g. the ABS system).

In order to satisfy this need, microswitches associated with parts of the brake pump are typically provided, for example the braking lever or pedal, in order to measure the movements thereof and to signal the braking.

SUMMARY OF THE INVENTION

However, if the empty stroke of the brake pump is short (for example in brake pumps with adjustable empty stroke), which is resorted to in order to have timely braking which is not always ensured by brake pumps with a long empty stroke, it is somewhat difficult if not impossible to obtain an operation of the microswitch capable of offering increased performance in terms of braking signaling timeliness, despite the braking readiness ensured by the brake pump.

The late signaling of braking is a drawback in terms of safety.

Moreover, in order to improve ergonomics, in certain cases of rear brake pump, i.e. mounted at the back of the vehicle, the braking lever or pedal may be adjustable and this in turn requires the use of adjustable microswitches in order to obtain the proper intervening point of the braking lever or pedal on the microswitch.

In certain cases in which braking is exerted by means of a braking pedal, the microswitch even requires being adjusted during the first assembling in order to ensure a proper intervening point.

The adjustment of the microswitch makes the brake pump less versatile and reliable in its configuration and in timely braking signaling.

It is the object of the present invention to devise and make available a brake pump for vehicles which allows at least partly obviating the drawbacks indicated above with reference to the known art, which ensures timeliness and reliability, therefore safety, in the signaling of braking.

Such an object is achieved by a brake pump according to claim 1.

Preferred embodiments of such a brake pump are defined in the dependent claims.

BRIEF DESCRIPTION OF THE DRAWINGS

Further features and advantages of the brake pump according to the invention will become apparent from the following description of preferred embodiments thereof, given only by way of non-limiting, indicative example, with reference to the accompanying drawings, in which:

FIG. 4 shows a perspective view of a component of the brake pump in FIG. 1, according to one embodiment of the invention;

FIGS. 5a and 5b show further sectional views, respectively, of a portion of the brake pump in FIG. 1;

FIGS. 13a-13d show a component of the brake pump in FIG. 1, according to further embodiments;

FIG. 14 shows a perspective view of a portion of a brake pump (partially cross-sectioned) according to a further embodiment of the invention;

DETAILED DESCRIPTION

Figure 1:
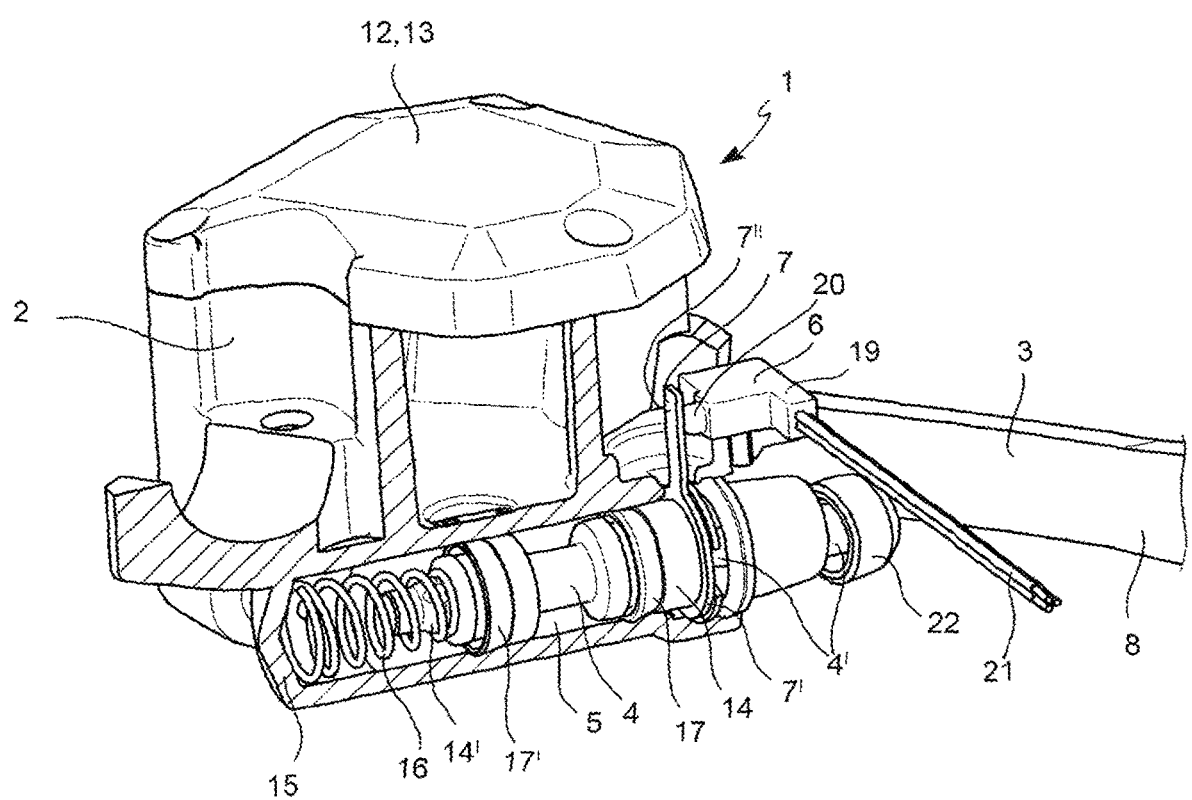
FIG. 1 shows a perspective view of a brake pump (partially cross-sectioned) according to one embodiment of the invention.
Figure 2:
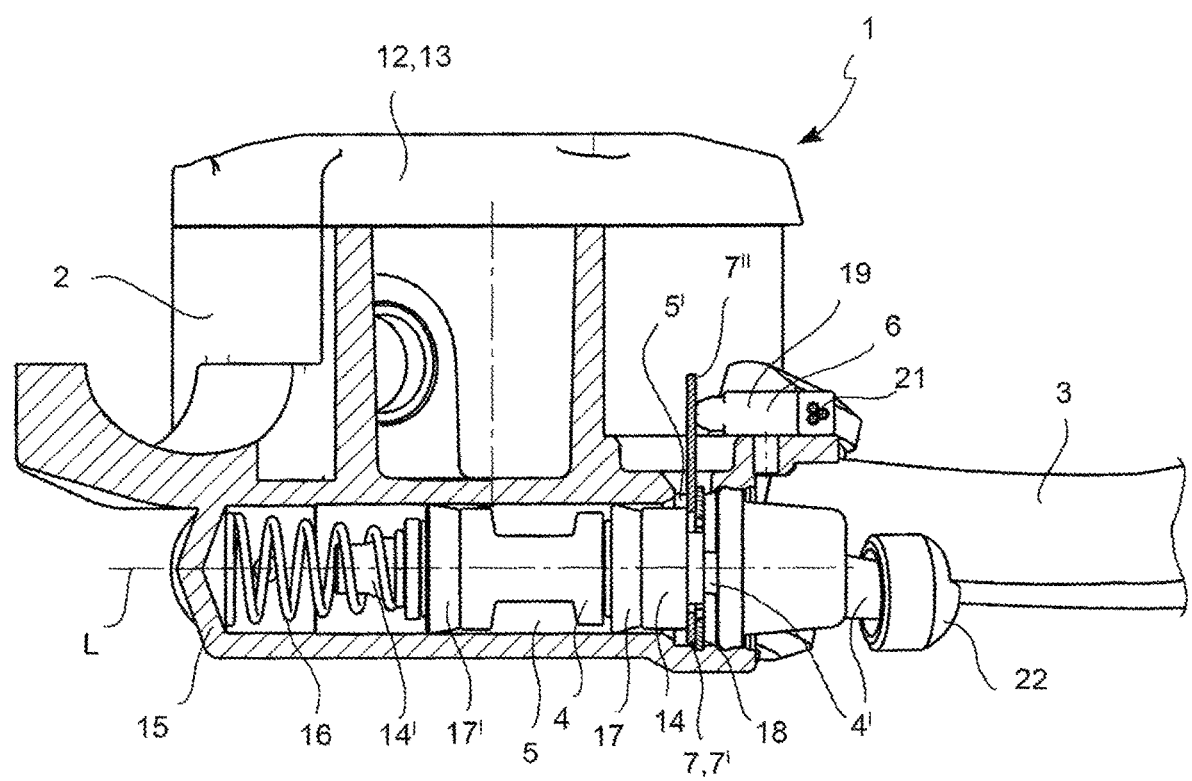
FIG. 2 shows a front view along the cross-sectioned plane, of the brake pump in FIG. 1, in a first operative condition.
Figure 3:
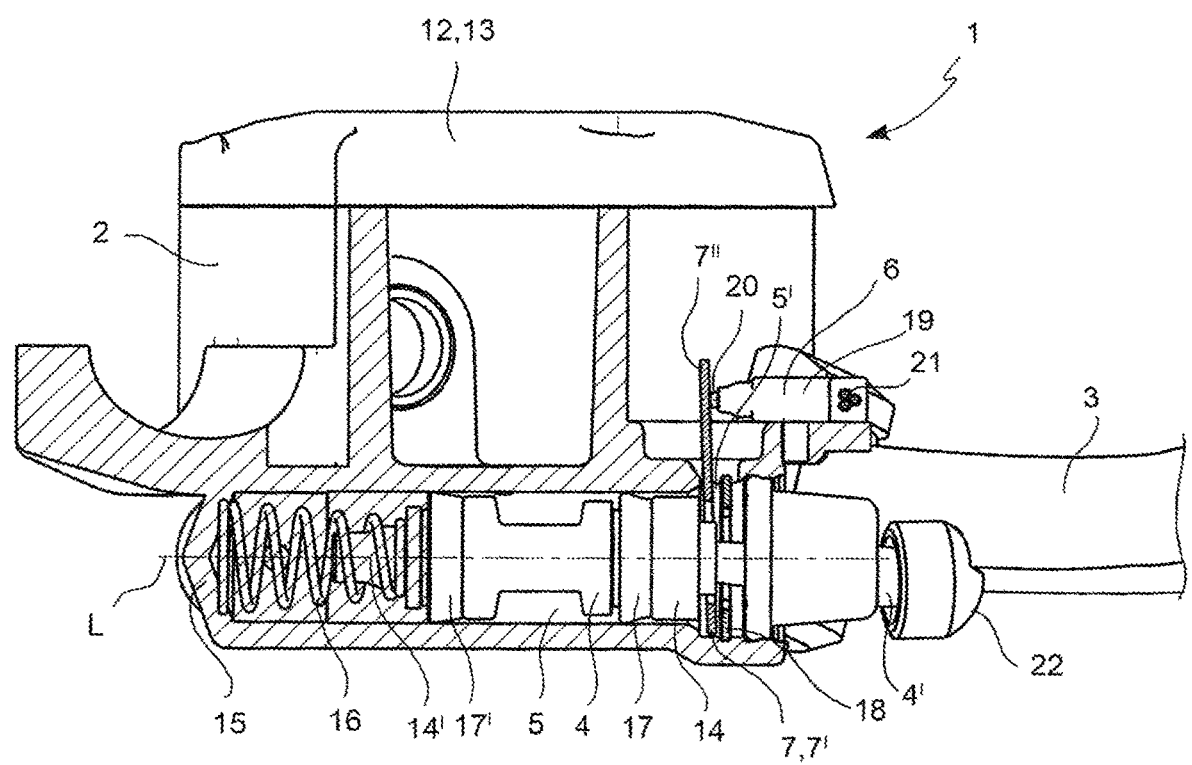
FIG. 3 shows a further front view along the cross-sectioned plane, of the brake pump in FIG. 1, in a second operative condition.
Figure 6:
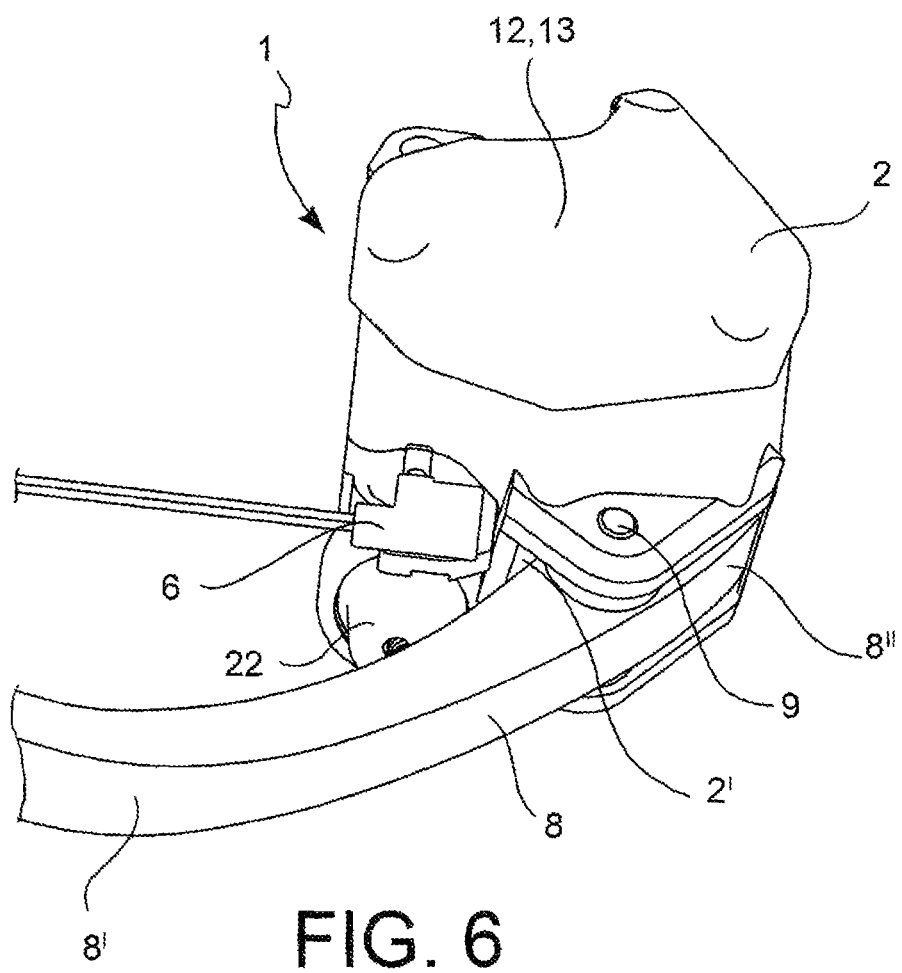
FIG. 6 shows a top view of the brake pump in FIG. 1.

With reference to FIGS. 1 to 3, a brake pump for vehicles is now described, in particular for motorcycles, according to one embodiment of the present invention.

It is worth noting that equal or similar elements are indicated with the same reference numbers.

The brake pump for vehicles, below also simply brake pump, is indicated as a whole with reference number 1.

The brake pump 1 belongs to a braking system (not shown in the figures) of a vehicle.

According to the embodiment in FIGS. 1, 2 and 3, the brake pump 1 comprises a pump body 2.

The brake pump 1 further comprises an actuation device 3 operatively associated with the pump body 2.

The actuation device 3 is operable by the driver or rider of the vehicle to generate a braking.

In one embodiment, the brake pump 1 may be frontal, i.e. mounted at the front of the vehicle.

In such a case, the actuation device 3, like the pump body 2, preferably is mounted on the handlebar of the vehicle, e.g. a motorcycle, to allow the driver to manually actuate the actuation device 3.

In such an embodiment, the actuation device 3 is a lever device 3 comprising a lever or handle.

In a further embodiment, the brake pump 1 may be rear, i.e. mounted at the back of the vehicle.

In such a case, according to a first embodiment, the actuation device 3 in any case may be mounted on the handlebar of the vehicle, e.g. a motorcycle, to allow the driver to manually actuate the actuation device 3.

In such an embodiment, the actuation device 3 is a lever device comprising a lever or handle.

Again if the brake pump 1 is rear, according to a further embodiment, the actuation device 3, like the pump body 2, is mounted on the rear part of the vehicle, e.g. a motorcycle, to allow the driver to manually actuate the actuation device 3 by means of his/her foot.

In such an embodiment, the actuation device 3 is a pedal device.

Returning to the embodiment in FIGS. 1, 2 and 3, the brake pump 1 further comprises a piston 4 housed inside a respective housing or barrel 5 of the pump body 2.

The piston 4 extends inside the housing 5 along a longitudinal axis L (FIGS. 2 and 3).

The piston 4 is operable by the actuation device 3 to vary the pressure of a brake fluid in the braking system to which the brake pump 1 belongs, to generate the braking.

The brake pump 1 advantageously comprises a switch group 6 operatively associated with the pump body 2.

According to one embodiment, for example the one shown in FIGS. 1 to 3, the switch group 6 is separable from the pump body 2.

In such a case, the switch group 6 indeed may be secured to the pump body 2 by means of the use of a screw inserted in a hole obtained on the pump body 2 and an O-ring. The screw and the O-ring are not shown in the figures.

This embodiment advantageously allows the switch group 6 to be separated from the pump body 2 for replacement operations in the case of breakdown or for maintenance operations on the switch group 6 and/or on the pump body 2.

According to a further embodiment, the switch group 6 is a single piece with the pump body 2.

Returning to the embodiment in FIGS. 1 to 3, the switch group 6 is configured to control the generation of an electric signal for signaling the braking according to the actuation of the piston 4 carried out by the actuation device 3.

The brake pump 1 further comprises an auxiliary actuation element 7 of the switch group 6 kinematically engaged with the piston 4.

"Kinematically engaged" means an engagement or connection between the auxiliary actuation element 7 of the switch group 6 and the piston 4 so that moving the piston 4 along a direction parallel to the longitudinal axis L corresponds with a movement of the auxiliary element 7 substantially along a direction parallel to the longitudinal axis L.

Advantageously, the engagement between the piston 4 and the auxiliary element 7 is such as to allow the movement of the auxiliary element 7 when the piston 4 moves, also integrally with the piston 4.

In other words, the engagement or kinematic connection between the piston 4 and the auxiliary element 7 is such that when the piston 4 moves, the auxiliary element 7 also becomes movable.

To this end, the auxiliary element 7 comprises a body directly in contact with a portion of the piston 4.

The auxiliary actuation element 7 of the switch group 6 is at least partly outside the pump body 2 to actuate the switch group 6 following the actuation of piston 4 carried out by the actuation device 3.

Figure 7:
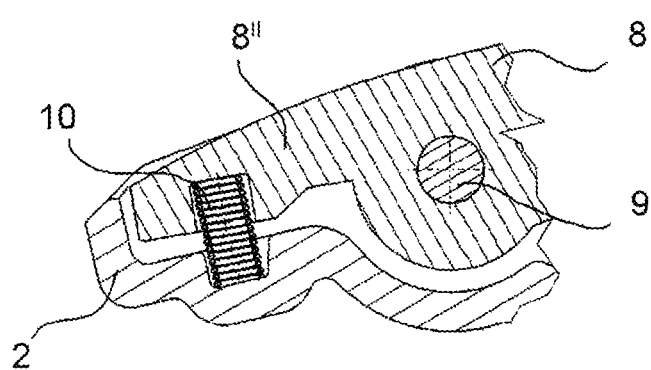
FIG. 7 shows a sectional view of a component of the brake pump in FIG. 6.
Figure 8:
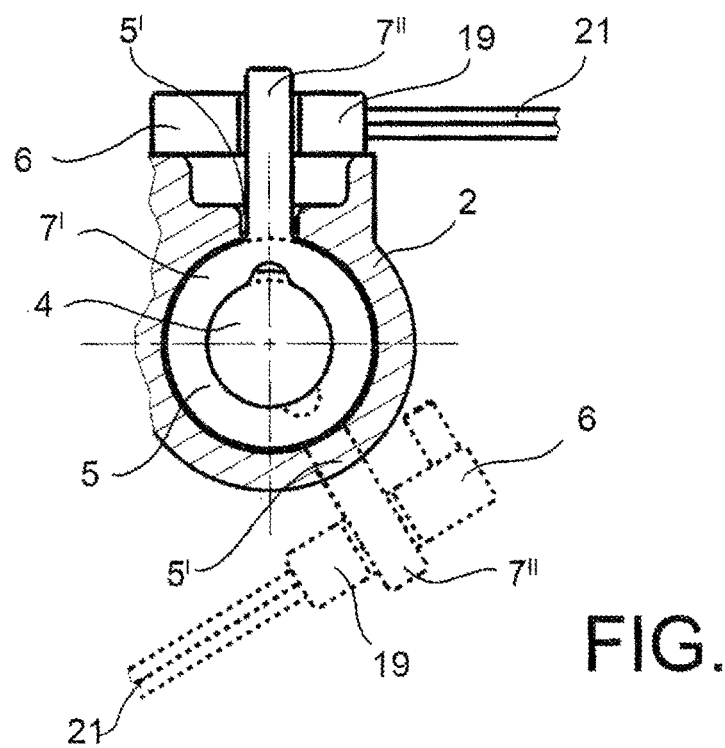
FIG. 8 shows a further sectional view of a component of the brake pump in FIG. 1, according to further embodiments of the invention.

Referring now also to FIGS. 7 and 8, according to one embodiment, the actuation device 3 comprises a lever 8, for example a handle or a pedal according to whether the brake pump 1 is of the front type or of the rear type, having a first free end 8', shown partly in the figures, and a second end 8" opposite to the first end, which is operatively connected to the pump body 2 by means of a pin 9.

It is worth noting that the lever 8 may also be of the adjustable type.

In particular, the lever 8 is configured to rotate about the pin 9 between a resting position (lever 8 not actuated by the driver or rider to generate the braking) and an operative position (lever 8 actuated by the driver or rider to generate the braking) and vice versa.

It is worth noting that the second end 8" of the lever 8 is operatively connected to the pump body 2 by means of a lever return spring 10 (FIG. 7).

The lever return spring 10 advantageously allows the lever 8 to take on and keep the resting position when the lever 8 is not subjected to actuation by the driver or rider.

In the operative position, the lever 8 is adapted to exert a thrust force on the piston 4, e.g. of the hydraulic type, the movement of which causes the pressure of a fluid in a hydraulic pipe to control the brake.

In greater detail, the lever 8 is adapted to exert the thrust force on the piston 4 by acting on a push rod 4', the free end of which is outside the pump body 2, which is operatively connected to the piston 4.

Finally, it is worth noting that in the embodiment in the figures, the pump body 2 is provided with a seat 2' inside of which there is inserted the second end 8" of the lever 8 of the actuation device 3 so as to constrain the movement of the lever 8 substantially along one plane alone which is transverse to the pin 9 during the rotation of the lever 8 itself about the pin 9.

According to the embodiment in FIGS. 1, 2 and 3, the brake pump 1 further comprises a tank 11 of the brake fluid housed inside the pump body 2, and a related cap 12 and membrane 13.

According to a further embodiment (not shown in the figures), the tank 11 of the brake fluid may be external to the pump body 2, for example when the brake pump is of the rear type.

With reference again to the embodiment in FIGS. 1, 2 and 3, as mentioned above, the piston 4 extends inside the housing 5 along a longitudinal axis L (FIGS. 2 and 3).

The movement of the piston 4 inside the housing 5 on the actuation of the actuation device 3, in particular of the lever 8, occurs along a direction which is parallel to the longitudinal axis L between a resting position, when the actuation device 3 is in the resting position (no actuation of the lever 8 carried out by the driver or rider), and an operative position when the actuation device 3 is in an operative position (actuation of the lever 8 carried out by the driver or rider).

The piston 4 comprises a first end 14 operatively connected to the push rod 4' and a second end 14', opposite to the first end 14, operatively connected to a wall 15 of the housing 5 which substantially is transverse to the longitudinal axis L of the piston 4, by means of a piston return spring 16.

The piston return spring 16 is adapted to bring the piston 4 from any operative position and to keep the piston in the resting position when the driver or rider ends the actuation of the lever 8 of the actuation device 3 to generate the braking.

According to one embodiment shown in the figures, the brake pump 1 further comprises at least a first O-ring seal 17 and a second O-ring seal 17' of the piston 4, which are distributed about the piston 4 to define a movable containment space of the hydraulic fluid inside the housing 5.

In the embodiment in the figures, the first O-ring seal 17 substantially is arranged at the first end 14 of the piston 4, while the second O-ring seal 17' substantially is arranged at the second end 14' of the piston 4.

The brake pump 1 further comprises at least one piston retaining ring 18 arranged about the piston 4 substantially at the connection between the first end 14 of the piston 4 and the push rod 4'.

It is worth noting that the auxiliary actuation element 7 of the switch group 6 is kinematically engaged with the piston 4 between the first end 14 of the piston 4 and the piston retaining ring 18.

With reference also to FIGS. 5a and 5b, according to one embodiment, the auxiliary actuation element 7 of the switch group 6 comprises a plate-shaped body having a first portion 7' shaped like at least one ring portion and a second appendage portion 7" extending from the first portion 7' shaped like at least one ring portion.

The first portion 7' shaped like at least one ring portion, below also only first portion 7' of the auxiliary element 7, is adapted to be engaged kinematically with the piston 4.

The second appendage portion 7', later also only second portion 7" of the auxiliary element 7, depicts the portion of the auxiliary element 7 which is at least partly outside the pump body 2 to actuate the switch group 6 following the actuation of the piston 4 carried out by the actuation device 3, as defined above.

According to one embodiment, shown by way of example in FIGS. 5a, 13b, 13c and 13d, the first portion 7' of the auxiliary element 7 substantially comprises a closed ring.

According to a further embodiment shown in FIG. 13a, alternative to the one described, the first portion 7' of the auxiliary element 7 substantially comprises an open ring.

According to different embodiments (shown in FIGS. 5a, 13a to 13d), in combination with any one of the preceding embodiments described above, the second portion 7" extending from the first portion 7' of the auxiliary element 7 extends on the same plane of development as the first portion 7' of the auxiliary element 7 (FIGS. 5a, 13a, 13c and 13d) or on one or more different planes with respect to the plane of development of the first portion 7' of the auxiliary element 7 (FIG. 13b).

Moreover, with reference again to FIGS. 5a, 13a to 13c, in combination with any one of the embodiments described above, the second portion 7" extending from the first portion 7' of the auxiliary element extends according to a substantially constant progression (e.g. parallel) with respect to a radial direction of extension from the first portion 7' (FIGS. 5a, 13a, 13b, 13d), or it extends according to a substantially variable progression (e.g. stepped) with respect to a radial direction of extension of the first portion (FIG. 13c).

According to the embodiments described, the auxiliary element 7 has a substantially rectangular section, it being a plate-shaped element.

According to further embodiments, alternative to the ones described above, the auxiliary actuation element 7 of the switch group 6 may have sections which differ from a rectangular section.

For example, in the embodiment shown in FIG. 13d, the second portion 7" extending from the first portion 7' of the auxiliary element 7 comprises a rib 71.

By increasing the section of the second portion 7" of the auxiliary element 7, the rib 71 allows to further increase the stiffness and the sturdiness of the second portion 7" of the auxiliary element 7.

According to a further embodiment, shown again in FIG. 13d, the second portion 7" extending from the first portion 7' of the auxiliary element 7 comprises an annular groove 72 extending transversely to the direction of development of the second portion 7" of the auxiliary element 7.

Such an annular groove 72 is adapted to be engaged with a protective cap which the pump body 2 could be provided with at a through opening of the housing 5 of the piston 4, as is also described later with reference to FIG. 14.

Indeed, as is reiterated later, the first portion 7' of the auxiliary element 7 is arranged about the piston 4 so that by passing inside a through opening of the pump body 2, the second appendage portion 7" is outside the pump body 2.

With reference to the various embodiments in FIGS. 13a to 13d, the second portion 7" of the auxiliary element 7 may be varied to obtain different responses (more or less timely) of the switch group 6 following the actuation of the actuation device 3.

Returning in general to the auxiliary actuation element 7 of the switch group 6, it is reiterated that such an auxiliary element 7 is kinematically engaged with the piston 4 so as to translate along the direction parallel to the longitudinal axis L of the piston 4 during the movement of the piston 4 inside the housing 5.

In particular, the first portion 7' of the auxiliary element 7 is arranged about the piston 4, as already mentioned above, between the first end 14 of the piston 4 and the piston retaining ring 18.

The first portion 7' of the auxiliary element is directly in contact with a portion of the piston 4.

Moreover, the first portion 7' of the auxiliary element 7 is arranged about the piston 4 so that by passing inside a through opening 5' of the pump body 2, the second appendage portion 7" is outside the pump body 2 (FIGS. 2 and 3).

It is worth noting that when the piston 4 is in the resting position under the actuation of the piston return spring 16 in the absence of an actuation of the actuation device 3, the auxiliary actuation element 7 of the switch group 6 is in contact with the piston retaining ring 18 (FIG. 2).

When the actuation device 3 is actuated, the lever 8 exerts a thrust on the push rod 4' such as to cause the movement of the piston 4 inside the housing 5 which opposes the actuation of the piston return spring 16, thus causing the auxiliary actuation element 7 of the switch group 6, in particular of the second appendage portion 7", to move away from the piston retaining ring 18 (FIG. 3).

Referring now also to FIG. 4, according to one embodiment, the switch group 6 comprises a casing 19.

The switch group 6 further comprises a switch 20, e.g. a microswitch, which is operatively connected to an electronic circuitry for signaling braking of the vehicle (not shown in the figures) to enable/disable such an electronic circuitry.

Electronic circuitry for signaling braking of the vehicle means both the electric load to be controlled (braking lamp, "stop") to which the switch group 6 may directly be connected, and the electronic control unit of the vehicle which, among the various functions to which it is dedicated, is adapted to electrically control the braking lamp.

It is worth noting that enabling/disabling the electronic circuitry carried out by the switch group 6, therefore by the switch 20, means closing/opening an electric circuit, respectively, which is adapted to electrically supply such an electronic circuitry.

The switch group 6 is associated with the pump body 2 so that the second appendage portion 7" of the auxiliary actuation element 7 of the switch group 6 is adapted to abut with the switch 20 of the switch group 6.

The switch 20 is configured to take on a first operative position and a second operative position according to the movement of the piston 4, therefore of the auxiliary actuation element 7 of the switch group 6.

In particular, the switch 20 is configured to take on the first operative position when the actuation device 3 is actuated to generate the braking. In the first operative position, the switch 20 is configured to enable the electronic circuitry for signaling braking of the vehicle upon the generation of the electric signal for signaling braking.

Moreover, the switch 20 is configured to take on the second operative position when the actuation device 3 is not actuated to generate the braking. In the second operative position, the switch 20 is configured to disable the electronic circuitry for signaling braking of the vehicle upon the generation of the electric signal for signaling braking.

Returning to the embodiment in the figures, the switch group 6 further comprises one or more electric cables 21 (partly shown in the figures) adapted to connect the switch group 6 to the electronic circuitry for signaling braking of the vehicle to possibly supply the switch group 6, and so on.

Figure 10A:
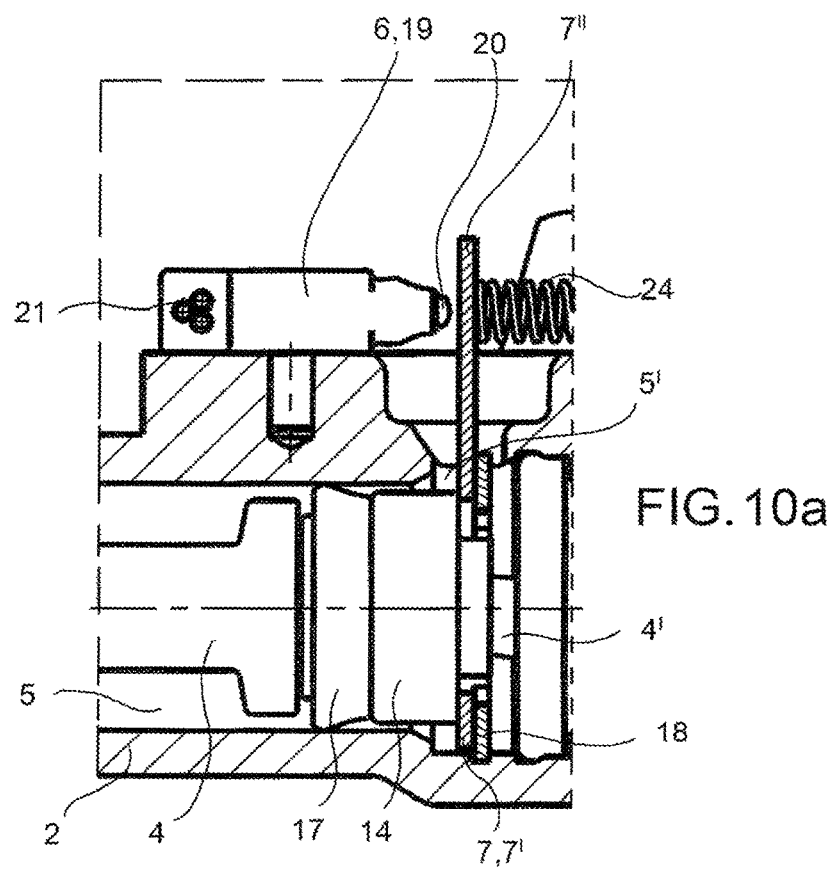
FIG. 10a shows an enlarged portion of a sectional view of a brake pump according to a further embodiment, in a first operative condition.
Figure 10B:
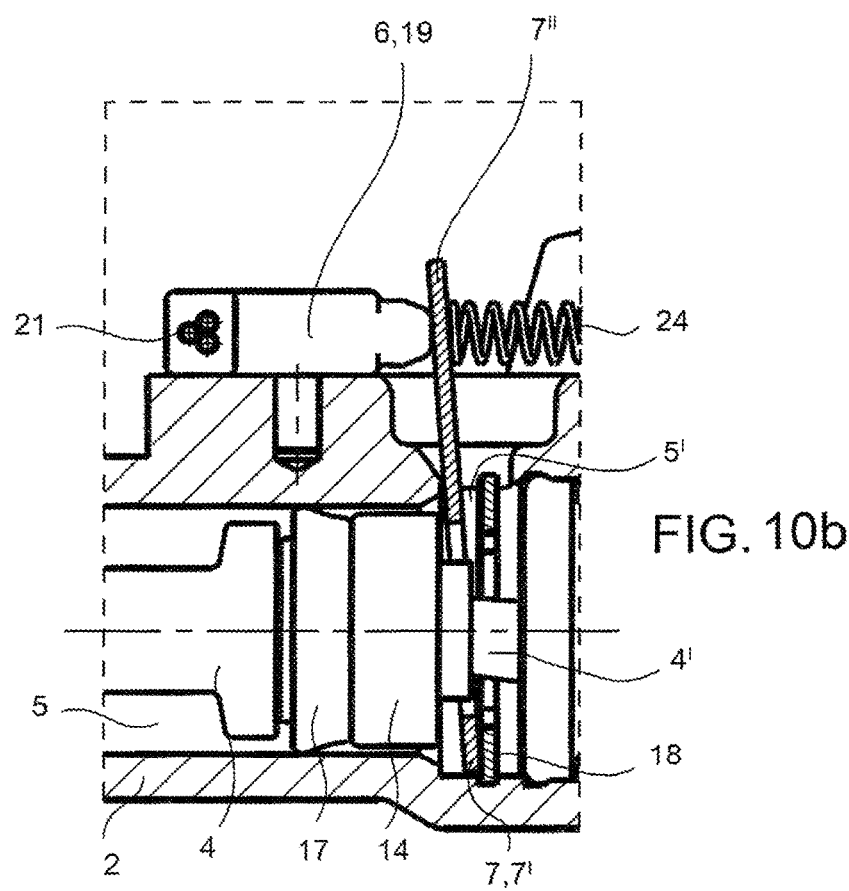
FIG. 10b shows the enlarged portion in FIG. 10a, in a second operative condition.

In one embodiment shown in FIGS. 2, 3, 10a and 10b, the switch 20 is configured to take on the first operative position when the auxiliary actuation element 7 of the switch group 6 abuts against the switch 20 (retracted position of switch 20, as shown in FIGS. 2 and 10b).

In this embodiment, the switch 20 is also configured to take on the second operative position when the auxiliary actuation element 7 does not abut against the switch 20 (non-retracted position of the switch 20, as shown in FIGS. 3 and 10a).

It is worth noting that in order to cause the switch 20 to take on the non-retracted position (or resting position), the switch group 6 preferably is provided with a respective switch return spring (not shown in the figures) when the auxiliary actuation element 7 does not abut against the switch 20.

Figure 9A:
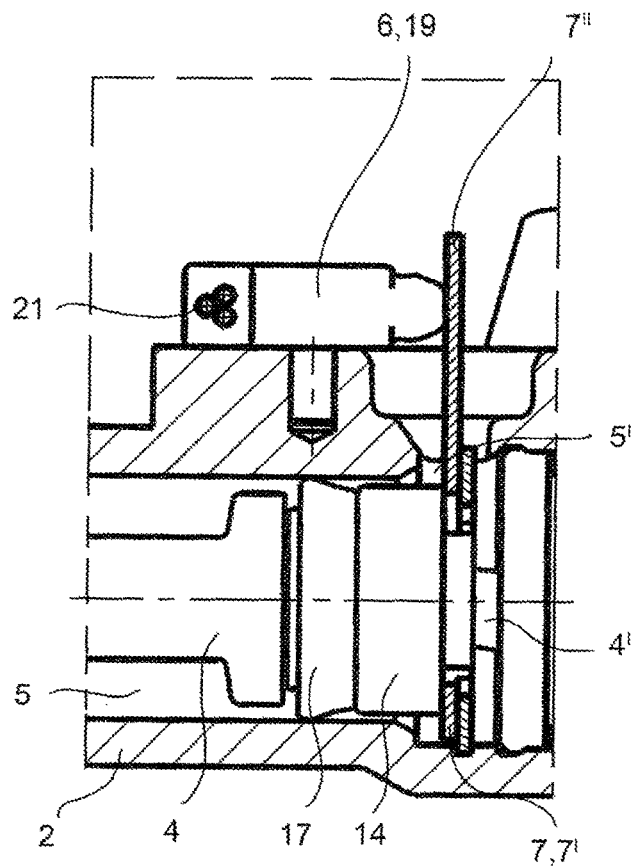
FIG. 9a shows an enlarged portion of a sectional view of the brake pump in FIG. 1, in a first operative condition.
Figure 9B:
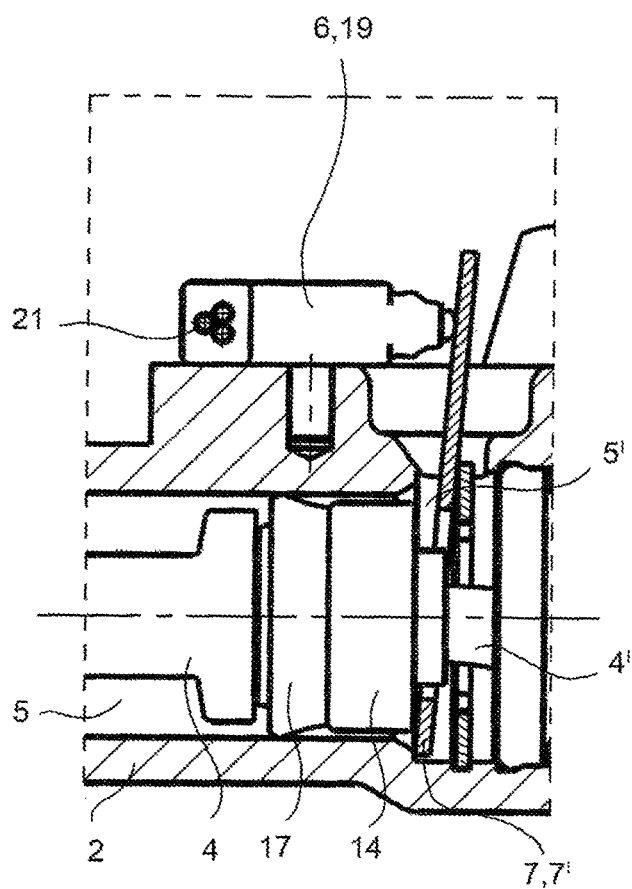
FIG. 9b shows the enlarged portion in FIG. 9a, in a second operative condition.

In a further embodiment shown in FIGS. 9a and 9b, the switch 20 is configured to take on the first operative position when the auxiliary actuation element 7 of the switch group 6 does not abut against the switch 20 (non-retracted position of the switch 20, as shown in FIG. 9b).

In this embodiment, the switch 20 is also configured to take on the second operative position when the auxiliary actuation element 7 of the switch group 6 abuts against the switch 20 (retracted position of the switch 20, as shown in FIG. 9a).

It is worth noting also in this case that in order to cause the switch 20 to take on the non-retracted position (or resting position), the switch group 6 preferably is provided with a respective switch return spring (not shown in the figures) when the auxiliary actuation element 7 does not abut against the switch 20.

According to one embodiment shown in FIGS. 2, 3, the switch group 6 is operatively associated with the pump body 2 from the auxiliary actuation element 7 of the switch group 6 toward the actuation device 3.

In this embodiment, the switch group 6 substantially is positioned outside the volume of the pump body 2.

It is worth noting that in this embodiment, the switch 20 of the switch group 6 is facing toward a first face of the auxiliary actuation element 7 of the switch group 6 facing toward the actuation device 3.

According to other embodiments, alternatively to the preceding one, shown in FIGS. 9a, 9b, 10a, 10b, the switch group 6 is operatively associated with the pump body 2 from the auxiliary actuation element 7 of the switch group 6 toward a first end of the pump body 2, opposite to a second end of the pump body 2, in which the actuation device 3 is operatively connected.

In this embodiment, the switch group 6 substantially is positioned above the volume of the pump body 2.

It is worth noting that in these embodiments, the switch 20 of the switch group 6 is facing toward a second face of the auxiliary actuation element 7 of the switch group 6, opposite to the first face, facing toward the first end of the pump body 2 opposite to the second end of the pump body 2 in which the actuation device 3 is operatively connected.

The embodiments according to FIGS. 9a, 9b, 10a, 10b advantageously ensure a reduced volume of the brake pump 1.

According to a further embodiment shown in FIG. 8, in combination with any one of the embodiments described above, the switch group 6 may be operatively associated with the pump body 2 at any position of the pump body 2. In this case, the through opening 5' of the housing 5 for the passage of the auxiliary actuation element 7 of the switch group 6, in particular of the second appendage portion 7", is obtained in a position which is suitable for allowing the second appendage portion 7" to face the switch group 6, in particular the switch 20.

The FIG. 8 uses solid lines to show the embodiment described with reference to the other figures and dotted lines to show an embodiment in which the switch group 6 is positioned and accordingly the through opening 5' of the housing 5 is defined on a lower side of the pump body 2.

It is worth noting that the FIG. 8 repeats the same numerals for both the embodiments shown.

According to a further embodiment shown for example in FIGS. 1, 2 and 3, in combination with any one of the embodiments described above, the brake pump 1 may comprise a first protective cap 22 operatively associated with the push rod 4'.

The first protective cap 22, which is arranged between the push rod 4' and the actuation device 3, advantageously allows the push rod 4' to be protected from dust and dirt in general.

According to a further embodiment shown in FIG. 13, in combination with any one of the embodiments described above, the brake pump 1 may comprise a second protective cap 23 operatively associated with the pump body 2 at the through opening 5' of the housing 5 of the piston 4.

The second protective cap 23 advantageously allows to prevent the entry of dirt or dust inside the housing 5 of the piston 4 by means of the respective through opening 5'.

According to a further embodiment, alternative to the ones shown in the figures, the seat into which the second end 8" of the lever 8 of the actuation device 3 is inserted, so as to constrain the movement of the lever 8 substantially along one plane alone which is transverse to the pin 9 during the rotation of the lever 8 itself about the pin 9, may be made in a plate operatively connected to the pump body 2.

According to a further embodiment shown in FIGS. 10a and 10b, alternatively to or in combination with the ones described above, the actuation of the switch group 6, in particular of the switch 20, may be obtained with the aid of a further thrust spring 24 operatively associated with the auxiliary actuation element 7.

According to a further embodiment, alternatively to or in combination with the ones described above, the actuation of the switch group 6, in particular of the switch 20, may be obtained with the aid of the second protective cap 23 (FIG. 14), which is possibly pre-tensioned when the brake pump 1 is in the resting condition.

Returning to the cap 12 of the pump body 2 described above, it is worth noting that according to one embodiment, the cap 12 may serve the function of protection, thus allowing the simplification or elimination of the protection caps described above, the function of constraining the movement of the lever of the actuation device 3 substantially along one plane alone which is transverse to the pin 9 during the rotation of the lever 8 itself about the pin 9.

Figure 11:
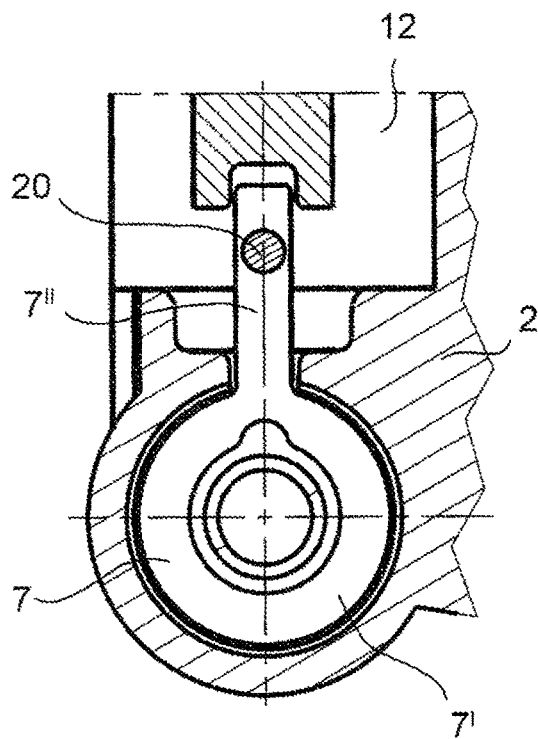
FIG. 11 shows a sectional view of a portion of a brake pump according to a further embodiment of the invention.

According to a further embodiment shown in FIG. 11, the cap 12 may be shaped to serve the function of constraining the movement of the auxiliary actuation element 7 of the switch group 6, in particular of preventing a possible rotation of the second appendage portion 7" about the longitudinal axis L.

Figure 12:
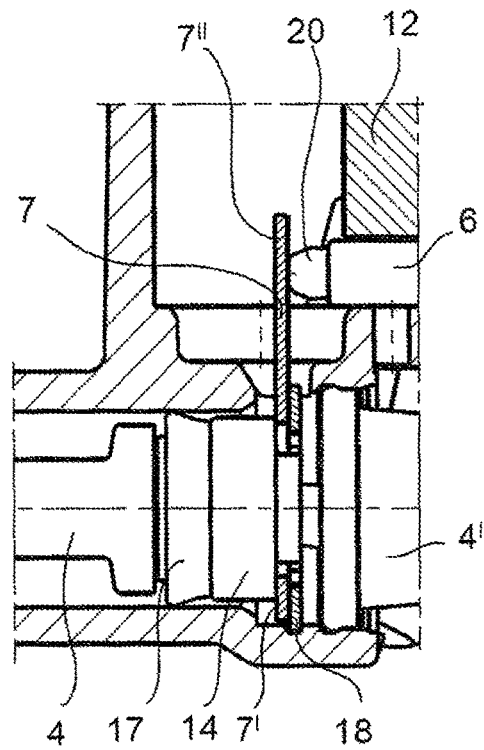
FIG. 12 shows a sectional view of a portion of a brake pump according to a further embodiment of the invention.

According to a further embodiment shown in FIG. 12, the cap 12 may also be shaped to serve the function of constraining the switch group 6 on the pump body 20, in particular of preventing a possible movement of the switch group 6 which may bring the switch 20 outside the abutment of the second portion 7" of the auxiliary element 7.

According to further embodiments, among which also the ones shown in FIGS. 15a, 15b, 16 to 21, alternatively to or in combination with the ones described above, the auxiliary actuation element 7 of the switch group 6 comprises a first end 80 which is directly in contact with the piston 4, and a second end 81, opposite to said first end 80, which is hinged externally to the pump body 2 in a fixed retaining point P with respect to the pump body 2.

The first end 80 of the auxiliary element 7 is directly in contact with the first end 14 of the piston 4 operatively connected to the push rod 4' between the first end 14 of the piston 4 and the piston retaining ring 18.

As mentioned above, the piston 4 comprises a second end (not shown in the aforesaid figures), opposite to the first end 14, operatively connected to a wall of housing 5, substantially transverse to the longitudinal axis L of the piston 4, by means of a piston return spring (it not shown either in the aforesaid figures).

It is reiterated that the piston return spring is adapted to bring the piston 4 from any operative position and to keep the piston in the resting position when the driver or rider ends the actuation of lever 8 of the actuation device 3 to generate braking.

According to these embodiments, the auxiliary element 7 is configured to rotate about the retaining point P following a displacement of the first end 80 of the auxiliary element 7, due to the movement of the piston 4 inside the housing 5, on the actuation of the actuation device 3, along the direction parallel to the longitudinal axis L between a first operative position and a second operative position.

The switch 20 is configured to take on a first operative position and a second operative position according to the movement of the piston 4, therefore of the auxiliary actuation element 7 of the switch group 6.

Figure 15A:
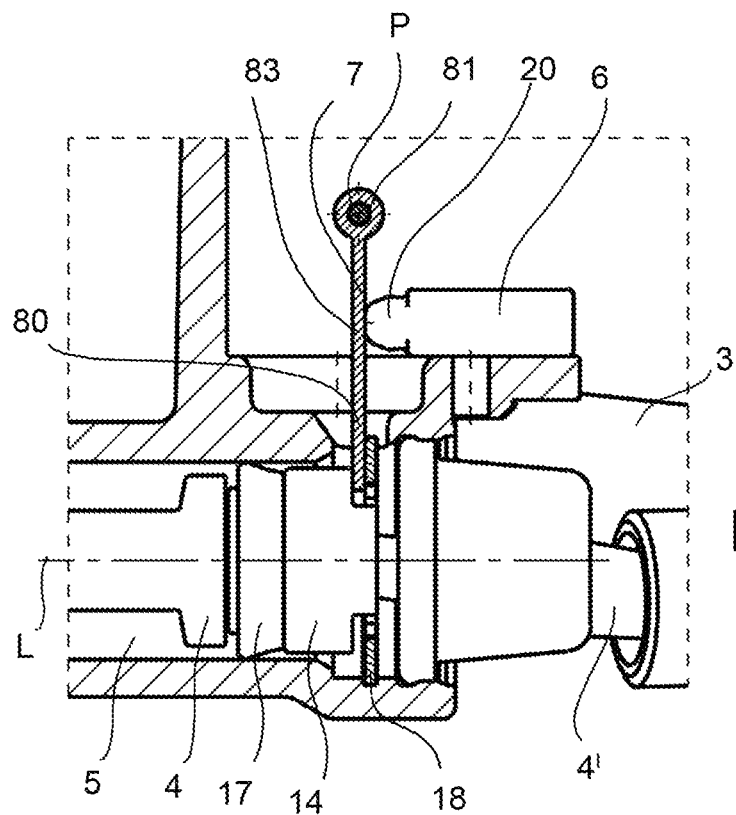
FIG. 15a shows an enlarged portion of a sectional view of a brake pump according to a further embodiment, in a first operative condition.
Figure 15B:
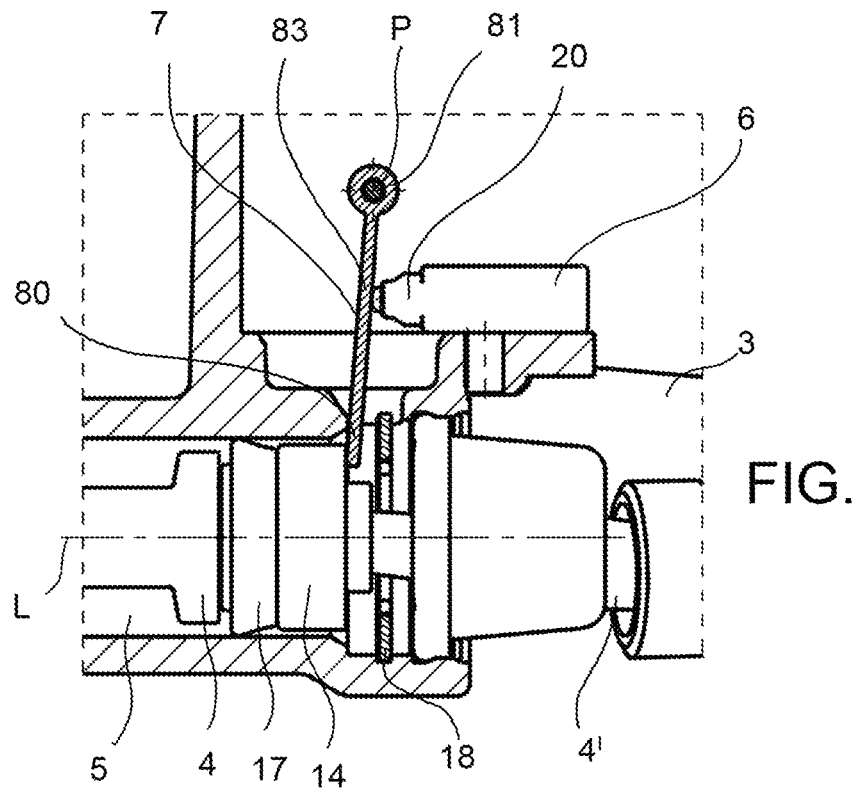
FIG. 15b shows the enlarged portion in FIG. 15a, in a second operative condition.

In particular, the switch 20 is configured to take on the first operative position when the actuation device 3 is actuated to generate the braking (see e.g. FIG. 15b).

In the first operative position, the switch 20 is configured to enable the electronic circuitry for signaling braking of the vehicle upon the generation of the electric signal for signaling the braking.

Moreover, the switch 20 is configured to take on the second operative position (resting position) when the actuation device 3 is not actuated to generate the braking (see e.g. FIGS. 15b, 16 to 21). In the second operative position, the switch 20 is configured to disable the electronic circuitry for signaling braking of the vehicle upon the generation of the electric signal for signaling the braking.

To this end, the switch 20 is configured to take on the first operative position when the auxiliary actuation element 7 of the switch group 6 does not abut against the switch 20 (non-retracted position of the switch 20, as shown in FIG. 15b).

The switch 20 is also configured to take on the second operative position (resting position) when the auxiliary actuation element 7 abuts against the switch 20 (retracted position of the switch 20, as shown in FIGS. 15a, 16 to 21).

With reference again to the embodiments in FIGS. 15a, 15b, 16 to 21, it is worth noting that when the piston 4 is in the resting position under the actuation of the piston return spring in the absence of an actuation of the actuation device 3, the auxiliary actuation element 7 of the switch group 6 is in contact with the piston retaining ring 18 (FIGS. 15a, 16 to 21).

When the actuation device 3 is actuated, a thrust is exerted on the push rod 4' such as to cause the movement of the piston 4 inside the housing 5 which opposes the actuation of the piston return spring, thus causing the auxiliary actuation element 7 of the switch group 6 to move away from the piston retaining ring 18 (FIG. 15b).

According to one embodiment, the auxiliary actuation element 7 of the switch group 6 comprises an arm 83 extending from the first end 80 directly in contact with the piston 4 to the second end 81, opposite to said first end 80, which is hinged externally to the pump body 2 in the fixed retaining point P with respect to the pump body 2, in which a portion of the arm outside the pump body 2 is adapted to come into contact with the switch group 6 (see e.g. FIGS. 15a, 15b, 18, 19, 20 and 21).

In one embodiment, such an arm 83 may comprise one segment alone (FIGS. 15a, 15b, 18, 20).

In one embodiment, such an arm 83 may comprise two segments arranged at a set angle from each other, e.g. at 90° (FIGS. 19 and 21) or at any other angle.

Figure 18:
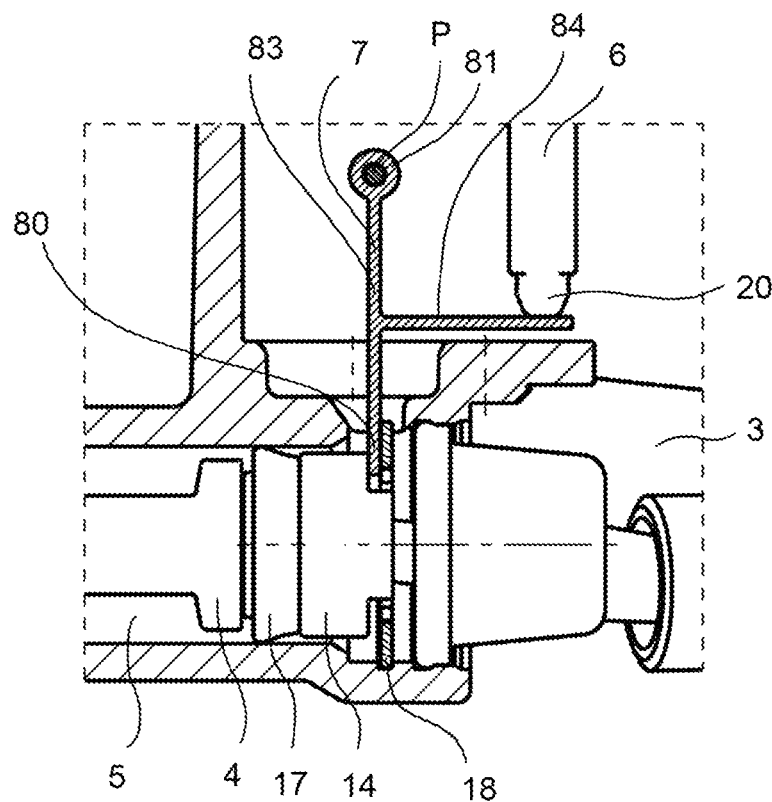
Figure 19:
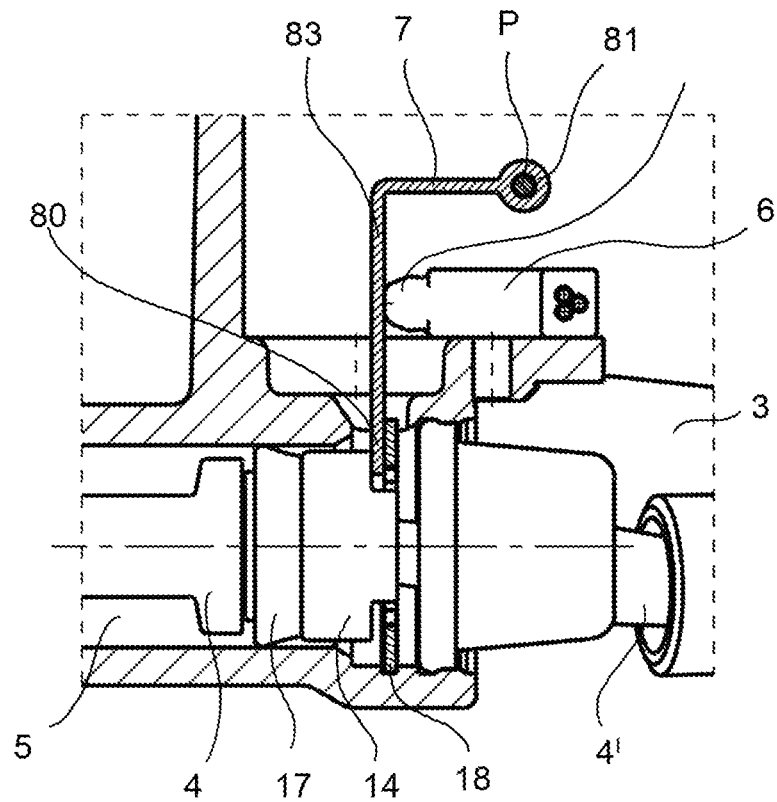
Figure 20:
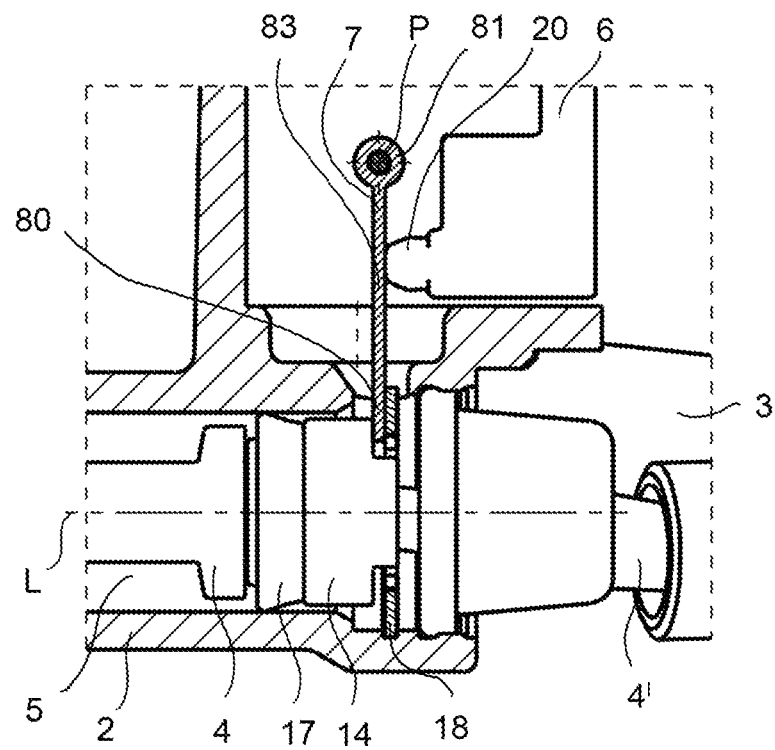

In one embodiment, the auxiliary element 7 comprises a further arm 84 extending from such an arm 83 at a point of the portion of arm 83 outside the pump body 2 (FIG. 18).

A portion of the further arm 84 is adapted to come into contact with the switch group 6 (FIG. 18).

The further arm 84 extends, with respect to the arm 83, with an inclination equal to a set angle, e.g. at 90° (FIG. 18) or at any other angle.

Figure 16:
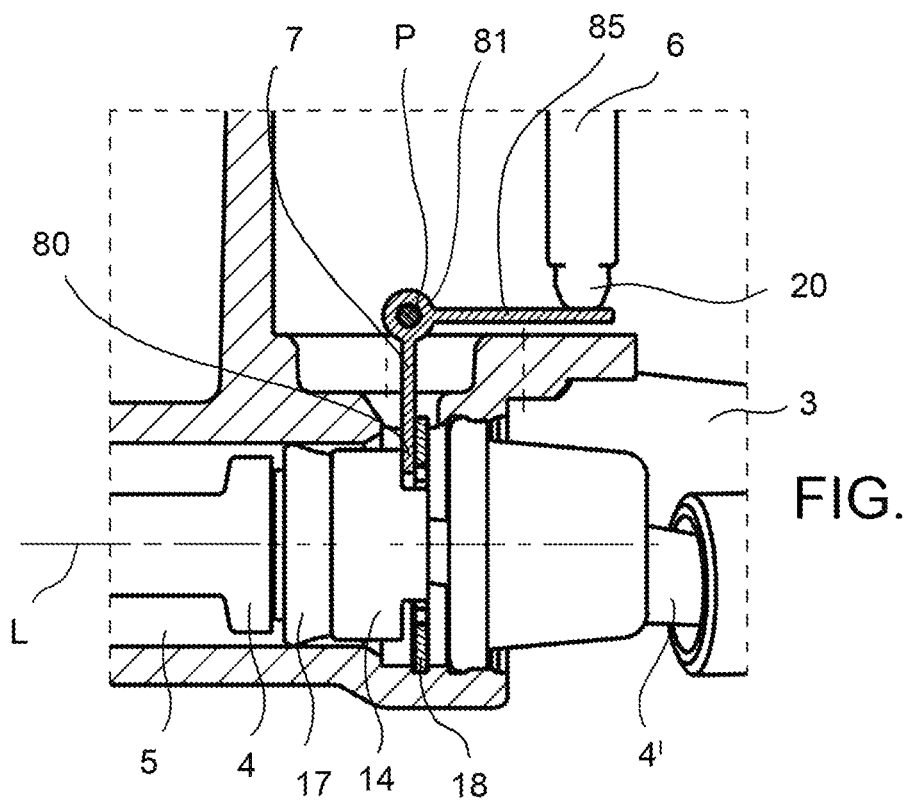
FIGS. 16, 17, 18, 19, 20 and 21 show, respectively, an enlarged portion of a sectional view of a brake pump according to further embodiments, in a respective operative condition.
Figure 17:
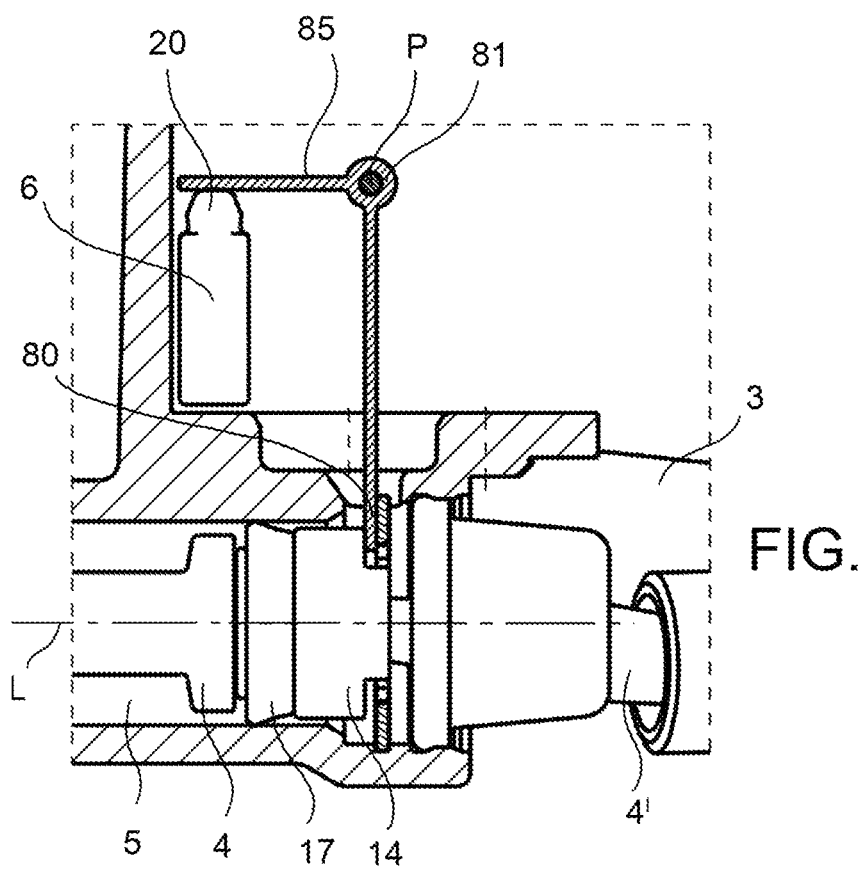

According to one embodiment, the auxiliary element 7 comprises an arm 83 extending from the first end 80 directly in contact with the piston 4 to the second end 81, opposite to said first end 80, which is hinged externally to the pump body 2 in the fixed retaining point P with respect to the pump body 2, and a further arm 85 extending from the second end 81 of the auxiliary element 7 in which a portion of the further arm 85 is adapted to come into contact with the switch group 6 (see e.g. FIGS. 16 and 17).

The further arm 85 extends, with respect to the arm 83, with an inclination equal to a set angle, e.g. at 90° (FIGS. 16 and 17) or at any other angle.

According to any one of the preceding embodiments (FIGS. 15a, 15b, 16 to 21), it is worth noting that by varying the length of the arms and/or the segments forming part of the auxiliary element 7, different responses (more or less timely) may be obtained of the switch group 6 following the actuation of the actuation device 6.

Moreover, it is worth noting that the possibility of having available an auxiliary element having an end hinged externally to a fixed retaining point with respect to the pump body and having arms and/or segments in which the number and/or length and/or configuration may be set according to the needs, allows the switch group 6 to be reached in any position and/or orientation with respect to the pump body 2 increasingly diminishing the overall volumes of the brake pump 1.

To this end, the embodiments in FIGS. 15a to 15b, 16 to 21 precisely show various positions and/or orientations of the switch group 6 with respect to the pump body 2.

Again with reference to the embodiments in FIGS. 15a, 15b, 16 to 21, it is worth noting that the fixed retaining point P with respect to the pump body 2 may be made in various ways, among which, by means of a pin, a recess in which suitable protrusions of the second end 81 of the auxiliary element 7 are housed, and so on.

In one embodiment, the retaining point P is on the pump body 2 (see e.g. FIGS. 15a, 15b, 16 to 20).

Figure 21:
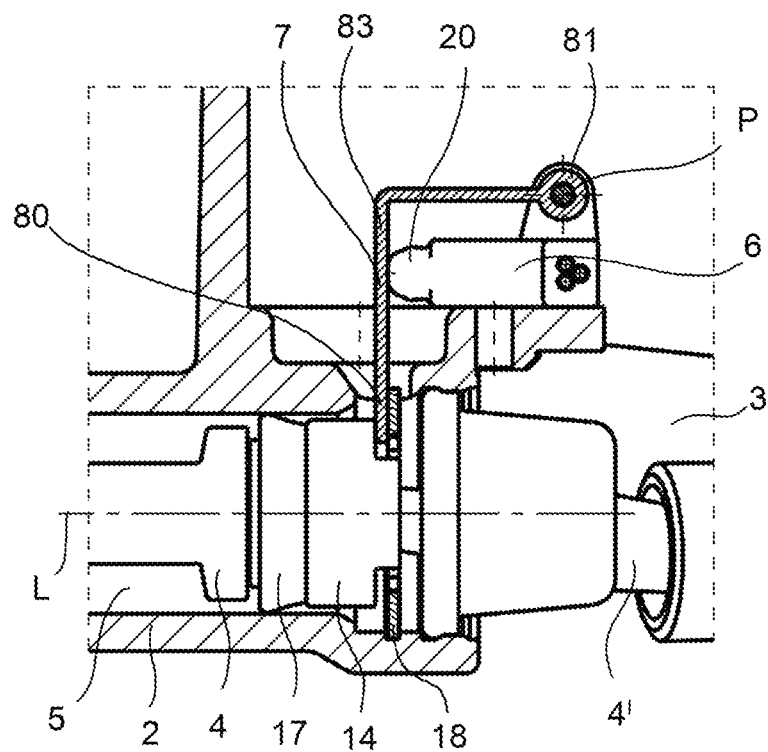
Figure 22:
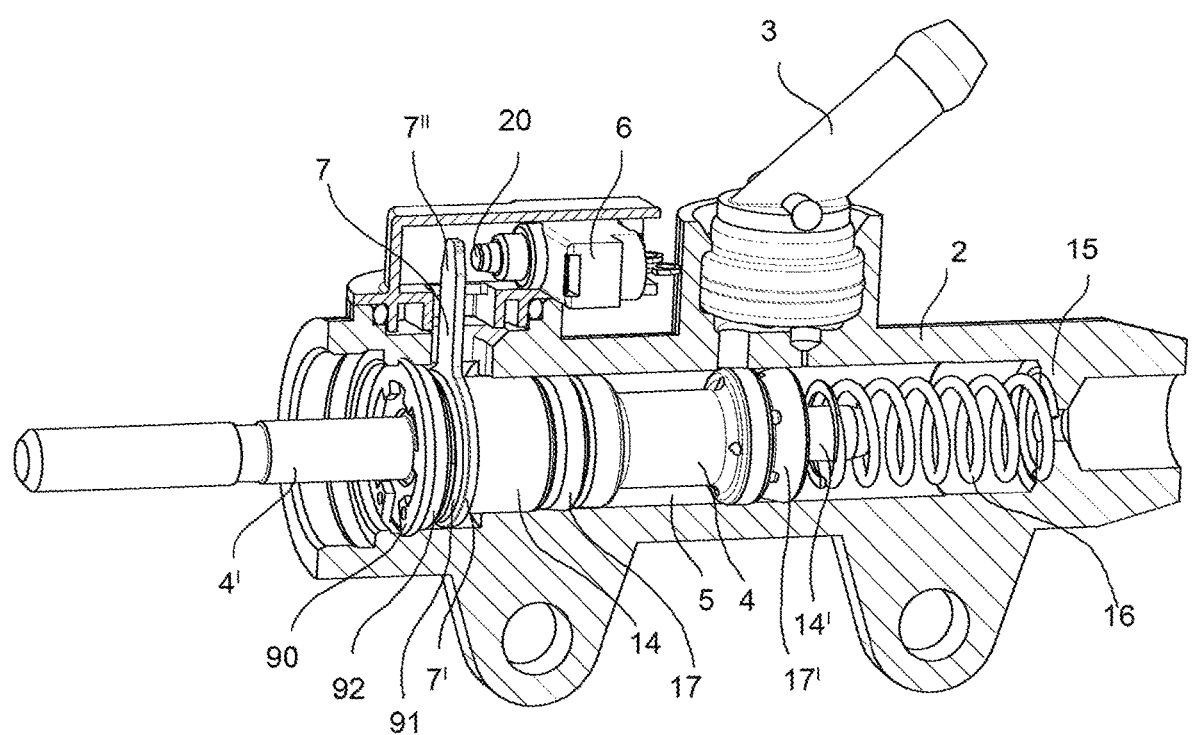
FIG. 22 shows a perspective view of a brake pump (partially cross-sectioned) according to a further embodiment of the invention.

According to a further embodiment, the retaining point P is on the switch group 6 (see e.g. FIG. 21).

With reference to FIGS. 22, 23a to 23c, a brake pump for vehicles is now described, in particular for motorcycles, according to one embodiment of the present invention, in combination with any one of the embodiments described above.

To this end, elements will not be repeated here which are equal or similar to the brake pump described above with reference to the embodiments described above.

The same numerals and/or letters will instead be used also in FIGS. 22, 23a to 23c and later in the present description.

The brake pump 1 comprises a stop ring 90 (e.g. a Seeger ring, i.e. with incomplete circumference) arranged about the push rod 4' operatively connected to the piston 4.

The stop ring 90 depicts an end of the housing 5 along the longitudinal axis L of the piston 4, the end opposite to the wall 15 of the housing 15 against which the piston return spring 16 (FIG. 22) abuts, in which the components arranged inside the housing 5 arranged about the piston 4 and the push rod 4', may abut.

The outer edge of the stop ring 90 is partly inserted in an annular seat defined on the inner wall of the housing 5 of the piston 4.

Thereby, the stop ring 90 avoids the mechanical components arranged inside the housing 5 about the piston 4 and the push rod 4', from coming out of the housing.

The brake pump 1 further comprises a spring 91 arranged about the push rod 4' operatively connected to the piston 4, between the auxiliary element 7 and the stop ring 90.

In particular, the brake pump 1 further comprises a support plate 92 of the spring 91 on the stop ring 90, the plate being arranged about the push rod 4' of the piston 4.

The spring 91 may be for example, according to various embodiments, a helical spring or a wave spring.

The spring 91 has a first set value K1 of elastic constant while the actuation device 3 has a second set value K2 of elastic constant.

The first set value K1 of elastic constant of the spring 91 is greater than the second set value K2 of elastic constant of the actuation device 3.

This advantageously allows the spring 91 to act as a preloading element on the auxiliary actuation element 7 which, by being pushed by the spring 91 to abut against the first end 14 of the piston 4, may take on as orthogonal a position as possible with respect to the longitudinal axis L of the housing 5 of the piston 4, thus preventing both possible accidental abutments of the auxiliary element 7 on the switch 20 of the switch group 6 and inaccuracies in the abutment of the auxiliary element 7 against the switch 20 of the switch group 6 following the actual actuation of the actuation device 6.

Figure 23A:
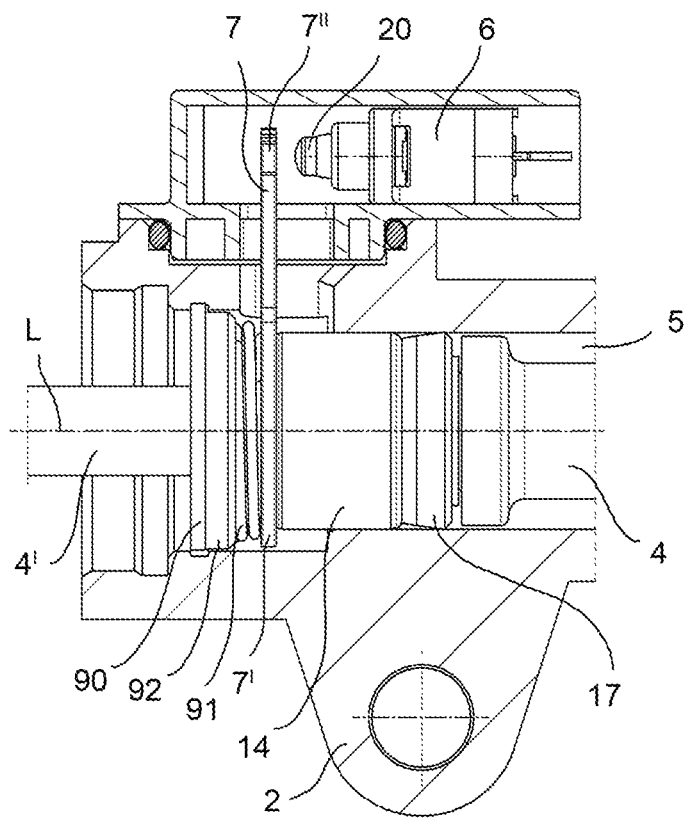
FIGS. 23a, 23b and 23c show, respectively, an enlarged portion of a sectional view of the brake pump in FIG. 22, in different operative conditions.

The FIG. 23a shows the brake pump 1 in a first operative condition in the absence of the actuation of the actuation device 3 in which the spring 91 preloads the auxiliary element 7 so as to take on an orthogonal position with respect to the longitudinal axis L of the housing 5 of the piston 4.

Figure 23B:
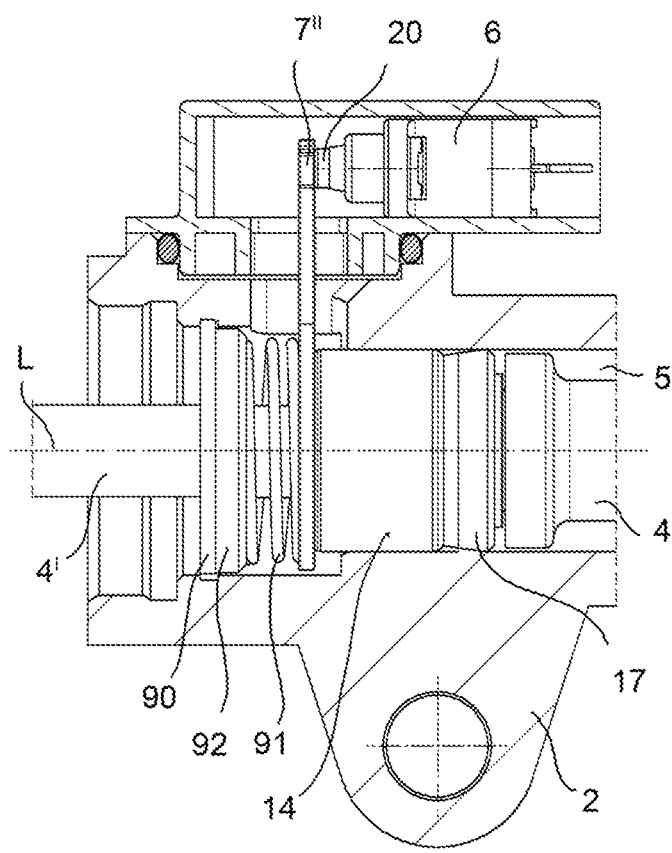

The FIG. 23b shows the brake pump 1 in a second operative condition in which the auxiliary element 7 abuts for the first time against the switch 20 of the switch group 6 following the actuation of the actuation device 3 carried out by the driver or rider of the vehicle.

Figure 23C:
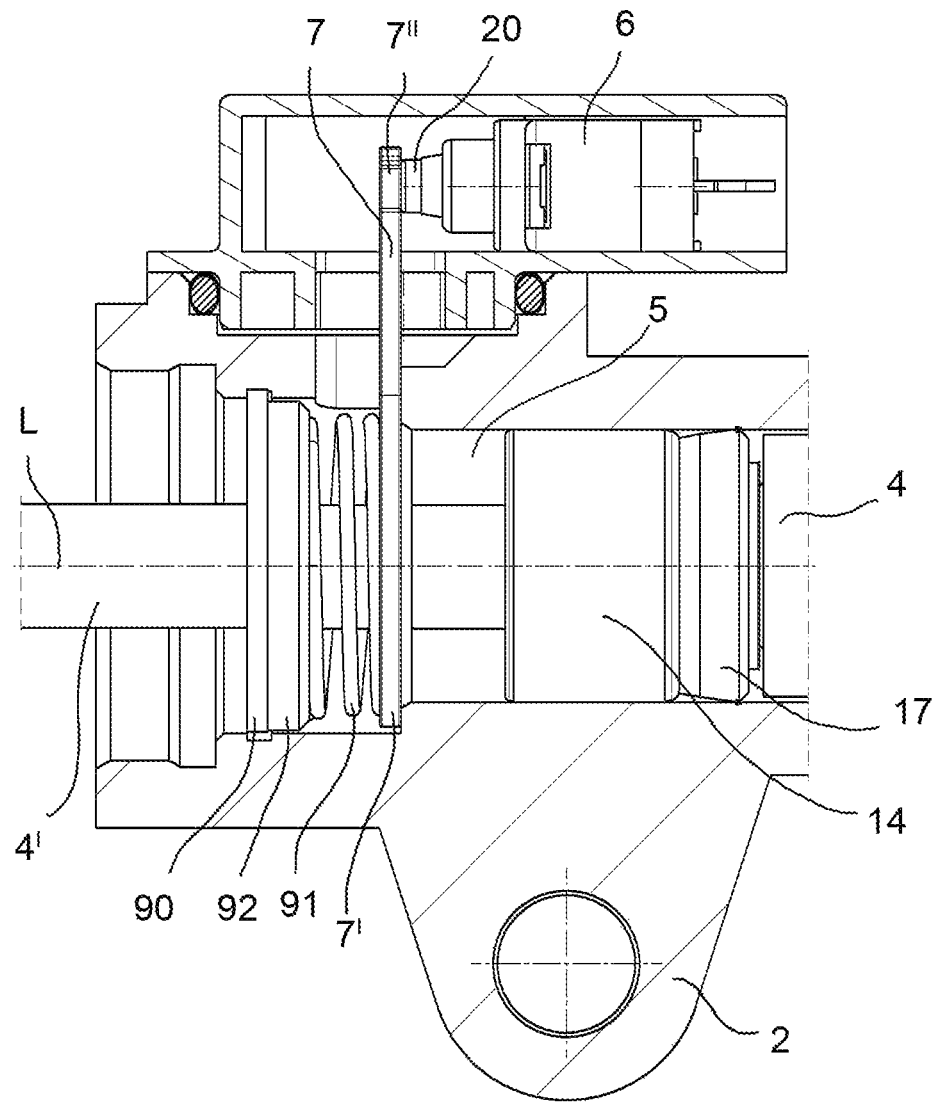

The FIG. 23c instead shows the brake pump 1 in a further operative condition in which the auxiliary element 7 again abuts against the switch 20 of the switch group 6 and the push rod 4' continues its stroke inside the housing 5 of the piston 4 following the actuation of the actuation device 3 carried out by the driver or rider of the vehicle.

Referring now in particular to FIGS. 1, 2 and 3, an operating example is described of the brake pump 1 according to one embodiment of the invention.

In absence of actuation of the actuation device 3, the piston 4, under the actuation of the piston return spring 16, is in the resting position.

In this resting position (shown in FIG. 2), the first portion 7' of the auxiliary actuation element 7 of the switch group 6 is in contact with the piston retaining ring 18, while the second appendage portion 7" is in contact with the switch 20 of the switch group 6 which, by taking on the second operative position, disables the electronic circuitry of the switch group 6.

Thus, no electric signal for signaling braking is generated.

Following the actuation of the actuation device 3 by the driver or rider of the vehicle, the actuator device 3, in particular the lever 8, exerts a thrust force on the piston 4 by means of the push rod 4', which moves inside the housing 5 of the pump body 2 along a direction parallel to the longitudinal axis L of the piston 4, thus contracting the piston return spring 16.

Following the movement of the piston 4, the auxiliary actuation element 7 of the switch group 6 also moves.

In particular, the first portion 7' of the auxiliary actuation element 7 of the switch group 6 moves away from the piston retaining ring 18, while the second appendage portion 7" of the auxiliary actuation element 7 of the switch group 6 moves away from the switch group 6, thus allowing the switch 20 to take on the first operative condition, thus accordingly enabling the electronic circuitry for signaling braking of the vehicle.

Thereby, the electric signal for signaling braking is generated.

As can be noted, the object of the invention is achieved because the brake pump 1 described has the following advantages.

Firstly, the brake pump 1 ensures increased timeliness in signaling the braking.

Indeed, the brake pump 1 may have a lower empty stroke of the piston 4 with respect to a conventional push-insert pump because the empty stroke of the piston is caused by a smaller number of elements and/or components, therefore resulting in a reduced series of tolerances.

Moreover, the switch group 6 with microswitch (switch 20) allows the movement of the piston 4 to be directly measured and the microswitch (switch 20) may also be actuated with reduced movements of the piston itself according to the length of the second appendage portion 7" of the auxiliary actuation element 7 of the switch group 6. Thereby, a signaling of braking may thus be obtained in a timelier manner.

Moreover, in the case of a rear brake pump, i.e. mounted at the back of the vehicle, the fact that the switch group 6 forms part of the brake pump 1 allows a more versatile pump brake to be available, which is easily adapted to various vehicles, both in front position and in rear position.

Indeed, in the specific case in which the brake pump 1 is of the rear type, the fact that the switch group 6 forms part (because it is integrated) of the brake pump 1 avoids having to necessarily apply a switch to a pedal of the vehicle, therefore leaving the possibility of arranging a simpler pedal board.

Moreover, in the case of adjustable pedal, by using the brake pump 1 of the present invention, it may be avoided the use of a switch to be applied to the pedal.

Additionally, in the case of adjustable pedal, since the switch to be applied to the pedal is not necessary, there is also no need to adjust the position of the switch to obtain the proper intervening point between pedal and switch.

Moreover, according to embodiments described above, the possibility of having available an auxiliary element having an end hinged externally to a fixed retaining point with respect to the pump body and having arms and/or segments in which the number and/or length and/or configuration may be set according to the needs allows the switch group 6 to be reached in any position and/or orientation with respect to the pump body 2 which increasingly contains the overall volumes of the brake pump 1.

Again, according to other embodiments described above, the fact that the auxiliary actuation element, under the action of a spring adapted to act as a preloading element, may take on a position as orthogonal as possible with respect to the longitudinal axis L of the housing 5 of the piston 4, allows both possible accidental abutments of the auxiliary element on the switch 20 of the switch group 6 and inaccuracies in the abutment of the auxiliary element 7 against the switch 20 of the switch group 6 following the actual actuation of the actuator device 3, to be avoided.

Those skilled in the art may make several changes and adaptations to the above-described embodiments of the brake pump, and may replace elements with others which are functionally equivalent in order to meet contingent needs, without departing from the scope of the following claims. All the features described above as belonging to a possible embodiment may be implemented irrespective of the other embodiments described.

The invention claimed is:

1. A brake pump for vehicles, comprising:
a pump body;
an actuation device operatively associated with the pump body, the actuation device being operable to generate a braking;
a piston housed inside a respective housing of the pump body, the piston being operable by the actuation device to vary the pressure of a brake fluid in a braking system to which the brake pump belongs, to generate the braking,
wherein a switch group is operatively associated with the pump body, the switch group being configured to control the generation of an electric signal for signaling braking according to the actuation of the piston carried out by the actuation device;
wherein said switch group straddles a non-fluid groove in said pump body so said switch group is supported by two edges of said pump body,
an auxiliary actuation element of said switch group kinematically engaged with the piston, wherein the auxiliary actuation element comprises a body which is directly in contact with a portion of the piston, said auxiliary actuation element having an appendage portion at least partly outside the pump body to actuate a switch located between said switch group and said appendage portion following the actuation of the piston carried out by the actuation device;
wherein said appendage portion extends through said groove.

2. The brake pump according to claim 1, wherein the switch is operatively connected to an electronic circuitry for signaling braking of the vehicle to enable/disable such an electronic circuitry.

3. The brake pump according to claim 2, wherein the switch is configured to take on a first operative position and a second operative position according to the movement of the piston, the switch being configured to take on the first operative position when the actuation device is actuated to generate the braking, the switch being configured in the first operative position to enable the electronic circuitry for signaling braking upon the generation of the electric signal for signaling braking.

4. The brake pump according to claim 3, wherein the switch is configured to take on the second operative position when the actuation device is not actuated to generate the braking, the switch being configured in the second operative position to disable the electronic circuitry for signaling braking of the vehicle upon the generation of the electric signal for signaling braking.

5. The brake pump according to claim 4, wherein the switch is configured to take on the first operative position when the auxiliary actuation element of the switch group abuts against the switch, the switch being configured to take on the second operative position when the auxiliary actuation element does not abut against the switch.

6. The brake pump according to claim 4, wherein the switch is configured to take on the first operative position when the auxiliary actuation element of the switch group does not abut against the switch, the switch being configured to take on the second operative position when the auxiliary actuation element of the switch group abuts against the switch.

7. The brake pump according to claim 2, wherein the auxiliary actuation element of the switch group comprises a plate-shaped body having a first portion shaped like at least one ring portion and the appendage portion extending from the first portion, the first portion being adapted to engage kinematically with the piston so that by passing inside a through opening of the housing of the pump body, the appendage portion is outside the pump body, the switch group being associated with the pump body so that the appendage portion of the auxiliary actuation element of the switch group is adapted to abut with the switch of the switch group.

8. The brake pump according to claim 7, wherein the first portion shaped like at least one ring portion substantially comprises a closed ring or an open ring.

9. The brake pump according to claim 7, wherein the appendage portion extends from the first portion of the auxiliary element extends on the same plane of development as the first portion of the auxiliary element or on one or more different planes with respect to the plane of development of the first portion of the auxiliary element.

10. The brake pump according to claim 7, wherein the appendage portion extends from the first portion of the auxiliary element extends according to a substantially constant progression with respect to a radial direction of extension from the first portion or extends according to a substantially variable progression with respect to a radial direction of extension from the first portion.

11. The brake pump according to claim 1, wherein the switch group is operatively associated with the pump body between the auxiliary actuation element of the switch group and the actuation device.

12. The brake pump according to claim 1, wherein the switch group is operatively associated with the pump body between the auxiliary actuation element of the switch group and a first end of the pump body, opposite to a second end of the pump body, wherein the actuation device is operatively connected.

13. The brake pump according to claim 7, wherein the second portion extending from the first portion of the auxiliary element comprises a rib.

14. The brake pump according to claim 7, wherein the second portion extending from the first portion of the auxiliary element comprises an annular groove extending transversely to the direction of development of the second portion of the auxiliary element, the annular groove being adapted to engage with a protective cap of the pump body at a through opening of the housing of the piston.

15. The brake pump according to claim 1, wherein the auxiliary actuation element of the switch group comprises a first end which is directly in contact with the piston, and a second end, opposite to said first end, which is hinged externally to the pump body in a fixed retaining point with respect to the pump body, the auxiliary element being configured to rotate about the retaining point following a displacement of the first end of the auxiliary element, due to the movement of the piston inside the housing on the actuation of the actuation device, along the direction parallel to the longitudinal axis between a first operative position and a second operative position.

16. The brake pump according to claim 15, wherein the auxiliary actuation element of the switch group comprises an arm extending from the first end directly in contact with the piston to the second end, opposite to said first end, which is hinged externally to the pump body in the fixed retaining point with respect to the pump body, wherein a portion of the arm outside the pump body is adapted to come into contact with the switch group.

17. The brake pump according to claim 16, wherein such an arm comprises one segment alone.

18. The brake pump according to claim 16, wherein such an arm comprises two segments arranged at a set angle from each other.

19. The brake pump according to claim 16, wherein the auxiliary element comprises a further arm extending from such an arm at a point of the portion of arm outside the pump body, a portion of the further arm being adapted to come into contact with the switch group, the further arm extending with an inclination equal to a set angle with respect to the arm.

20. The brake pump according to claim 16, wherein the auxiliary actuation element of the switch group comprises an arm extending from the first end directly in contact with the piston to the second end, opposite to said first end, hinged externally to the pump body in the fixed retaining point with respect to the pump body, and a further arm extending from the second end of the auxiliary element wherein a portion of the further arm is adapted to come into contact with the switch group, the further arm extending with an inclination equal to a set angle with respect to the arm.

21. The brake pump according to claim 15, wherein the retaining point is on the pump body.

22. The brake pump according to claim 15, wherein the retaining point is on the switch group.

23. The brake pump according to claim 1, wherein the brake pump comprises a stop ring arranged about a push rod operatively connected to the piston, the outer edge of the stop ring being partly inserted in an annular seat defined on the inner wall of the housing of the piston.

24. The brake pump according to claim 23, further comprising a spring arranged about the push rod operatively connected to the piston, between the auxiliary element and the stop ring.

25. The brake pump according to claim 24, wherein the spring has a first set value of elastic constant while the actuation device has a second set value of elastic constant, the first set value of elastic constant of the spring being greater than the second set value of elastic constant of the actuation device.

26. The brake pump according to claim 1, wherein the switch group is separable from the pump body.

27. The brake pump according to claim 1, wherein the switch group is a single piece with the pump body.

* * * * *